United States Patent
Huang et al.

(10) Patent No.: US 12,217,732 B2
(45) Date of Patent: Feb. 4, 2025

(54) ELECTRONIC DEVICE AND NOISE CANCELLATION METHOD THEREOF

(71) Applicant: HTC Corporation, Taoyuan (TW)

(72) Inventors: Chao Shuan Huang, Taoyuan (TW); Jin-Rong Tsai, Taoyuan (TW); Chien Chou Chen, Taoyuan (TW); Po-Fei Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 133 days.

(21) Appl. No.: 18/331,194

(22) Filed: Jun. 8, 2023

(65) Prior Publication Data

US 2024/0412718 A1 Dec. 12, 2024

(51) Int. Cl.
*G10K 11/178* (2006.01)

(52) U.S. Cl.
CPC .... *G10K 11/17819* (2018.01); *G10K 11/1785* (2018.01)

(58) Field of Classification Search
CPC ............ G10K 11/17819; G10K 11/1785
USPC ........................................................ 381/71.2
See application file for complete search history.

(56) References Cited

U.S. PATENT DOCUMENTS

| | | | | |
|---|---|---|---|---|
| 9,226,066 | B2 * | 12/2015 | Ohta | G10K 11/17883 |
| 2005/0053244 | A1 * | 3/2005 | Onishi | G10K 11/17823 |
| | | | | 381/71.8 |
| 2009/0074198 | A1 * | 3/2009 | Yoshida | G10K 11/17854 |
| | | | | 381/71.4 |
| 2011/0194708 | A1 * | 8/2011 | Chang | H04R 3/007 |
| | | | | 381/94.2 |
| 2012/0033821 | A1 * | 2/2012 | Ohta | G10K 11/17857 |
| | | | | 381/71.1 |
| 2012/0300955 | A1 * | 11/2012 | Iseki | G10K 11/17823 |
| | | | | 381/71.4 |

(Continued)

FOREIGN PATENT DOCUMENTS

| | | | | |
|---|---|---|---|---|
| CN | 113223489 | A * | 8/2021 | ....... G10K 11/17823 |
| EP | 1471328 | | 10/2004 | |

(Continued)

OTHER PUBLICATIONS

"Office Action of Taiwan Counterpart Application", issued on May 31, 2024, p. 1-p. 9.

(Continued)

*Primary Examiner* — David L Ton
(74) *Attorney, Agent, or Firm* — JCIPRNET

(57) ABSTRACT

An electronic device and a noise cancelation method thereof are provided. The electronic device includes a driver, a driven device, and an inertial measurement device. The driver is configured to generate a driving signal, and generate a noise prediction signal according to the driving signal. The driven device receives the driving signal to execute an operation, wherein the driven device generates a vibration noise according to generated vibrations when executing the operation. The inertial measurement device is configured to sense a position status of the electronic device to generate sensing information. The inertial measurement device receives the noise prediction signal, and compensates the sensing information according to the noise prediction signal to generate compensated sensing information.

12 Claims, 3 Drawing Sheets

(56) References Cited

U.S. PATENT DOCUMENTS

| | | | |
|---|---|---|---|
| 2013/0044891 A1* | 2/2013 | Obata | G10K 11/17817 |
| | | | 381/71.4 |
| 2018/0113148 A1 | 4/2018 | Riley et al. | |
| 2018/0350339 A1* | 12/2018 | Macours | B06B 1/0253 |

FOREIGN PATENT DOCUMENTS

| | | | | |
|---|---|---|---|---|
| EP | 2701302 B1 * | 2/2019 | | H02P 31/00 |
| TW | 201027902 | 7/2010 | | |

OTHER PUBLICATIONS

"Search report of European Counterpart Application", issued on Oct. 10, 2024, p. 1-p. 5.

* cited by examiner

ELECTRONIC DEVICE AND NOISE CANCELLATION METHOD THEREOF

BACKGROUND

Technical Field

The disclosure relates to an electronic device and a noise cancellation method thereof, and in particular to an electronic device and a noise cancellation method thereof which can improve position sensing accuracy.

Description of Related Art

With the advancement of electronic technology, electronic products have become important tools in lives of people. In order to enhance the operating experience of electronic devices, the current electronic devices often sense the position statuses of the electronic devices as reference information for human-machine interfaces.

Since the electronic device includes various elements, the elements may generate a certain degree of vibrations when executing operations. Therefore, when sensing the position status of the electronic device, the vibration noise generated by the vibrations causes errors in the sensing of the position status. The errors distort the position tracking operation of the electronic device, and cause errors and even risks of failure of human-machine operations.

SUMMARY

The disclosure provides an electronic device and a noise cancellation method thereof, which can improve the accuracy of position status sensing.

An electronic device of the disclosure includes a driver, a driven device, and an inertial measurement device. The driver is configured to generate a driving signal, and generate a noise prediction signal according to the driving signal. The driven device is coupled to the driver. The driven device receives the driving signal to execute an operation. The driven device generates a vibration noise according to generated vibrations when executing the operation. The inertial measurement device is coupled to the driver. The inertial measurement device is configured to sense a position status of the electronic device to generate sensing information. The inertial measurement device receives the noise prediction signal, and compensates the sensing information according to the noise prediction signal to generate compensated sensing information.

A noise cancellation method of the disclosure includes: generating a driving signal, and generating a noise prediction signal according to the driving signal; receiving, by a driven device, the driving signal to execute an operation, wherein the driven device generates a vibration noise according to generated vibrations when executing the operation; sensing, by an inertial measurement device, a position status of an electronic device to generate sensing information, and compensating the sensing information according to the noise prediction signal to generate compensated sensing information.

Based on the above, the electronic device of the disclosure generates the noise prediction signal according to the driving signal, and compensates the sensing information corresponding to the position status of the electronic device according to the noise prediction signal, which can effectively reduce the impact caused by the vibration noise in the sensing information to effectively improve the signal to noise ratio of the sensing information and improve the accuracy of position sensing of the electronic device.

DESCRIPTION OF THE EMBODIMENTS

Figure 1:
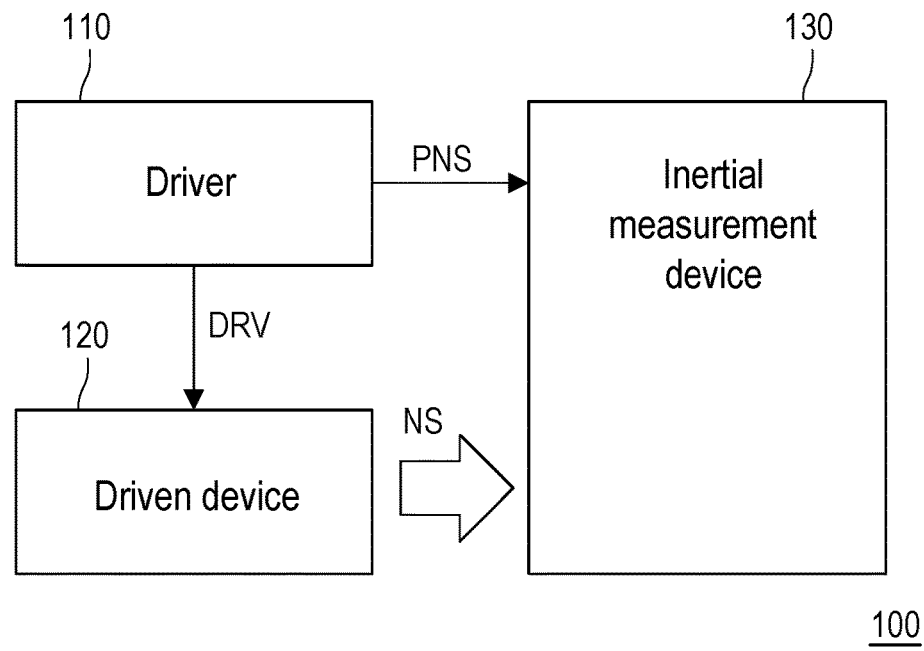
FIG. 1 is a schematic diagram of an electronic device according to an embodiment of the disclosure.

Please refer to FIG. 1. FIG. 1 is a schematic diagram of an electronic device according to an embodiment of the disclosure. An electronic device 100 includes a driver 110, a driven device 120, and an inertial measurement device 130. The electronic device 100 may be any portable electronic device. The inertial measurement device 130 is configured to measure a position status of the electronic device 100. In the embodiment, the driven device 120 may be any device that generates vibrations when operating, such as a cooling fan, a vibrator, or a speaker. The driver 110 is a driving circuit configured to drive the driven device 120.

In the embodiment of the disclosure, the driver 110 is coupled to the driven device 120. The driver 110 may generate a driving signal DRV according to actual requirements, and provide the driving signal DRV to the driven device 120, so that the driven device 120 may execute an operation corresponding to the actual requirements. For example, taking the driven device 120 as the cooling fan as an example, the driver 110 may generate the driving signal DRV according to a working status of the electronic device 100, and control the rotating speed of the cooling fan (the driven device 120) through the driving signal DRV. When the driven device 120 is running, corresponding vibrations are generated, and a vibration noise NS is generated according to the generated vibrations.

The inertial measurement device 130 is coupled to the driver 110. The inertial measurement device 130 is configured to measure the position status of the electronic device 100, so as to generate sensing information. However, since the driven device 120 synchronously generates the vibration noise NS, the sensing information generated by the inertial measurement device 130 further includes the vibration noise NS in addition to actual position information of the electronic device 100.

In order to cancel the vibration noise NS in the sensing information, the driver 110 in the embodiment of the disclosure further generates a noise prediction signal PNS according to the generated driving signal DRV. The driver 110 provides the noise prediction signal PNS to the inertial measurement device 130. In this way, the inertial measurement device 130 may compensate the generated sensing information according to the noise prediction signal PNS to generate compensated sensing information. The component of the vibration noise NS in the compensated sensing information may be greatly reduced, and the signal to noise ratio (SNR) of the compensated sensing information can be effectively improved.

To further illustrate, in the embodiment, the driver 110 may generate the noise prediction signal PNS according to the strength of the generated driving signal DRV. Also taking the driven device 120 as the cooling fan as an example, when the strength of the driving signal DRV generated by the driver 110 is stronger, it means that the rotating speed of the cooling fan (the driven device 120) is faster, the correspondingly generated vibrations are also larger, and the vibration noise NS with a greater value may be generated. In this way, the driver 110 may provide the corresponding noise prediction signal PNS according to the strength of the driving signal DRV.

In practical applications, engineer personnel may perform experiments on the vibration noises NS that may be generated by the cooling fan (the driven device 120) under the driving signal DRV of different strengths in advance, and record data. Through the recorded data, the engineering personnel may establish look-up table information in advance, and pre-store the look-up table information in the driver 110. During the process of the electronic device 100 executing the operation, the driver 110 may generate the noise prediction signal PNS according to the strength of the generated driving signal DRV based on the look-up table information, and provide the noise prediction signal PNS to the inertial measurement device 130, so that the inertial measurement device 130 may perform the compensation operation of the sensing signal according to the noise prediction signal PNS.

Figure 2:
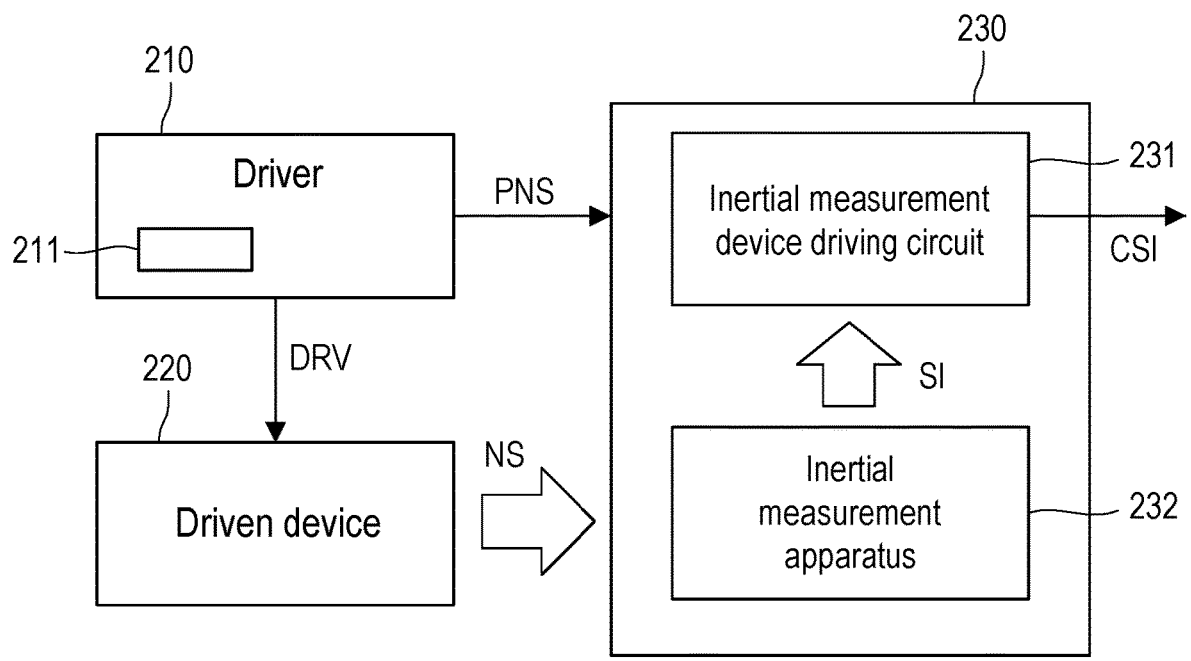
FIG. 2 is a schematic diagram of an electronic device according to another embodiment of the disclosure.

Please refer to FIG. 2 below. FIG. 2 is a schematic diagram of an electronic device according to another embodiment of the disclosure. An electronic device 200 includes a driver 210, a driven device 220, and an inertial measurement device 230. The driver 210 is coupled to the driven device 220 and the inertial measurement device 230. In the embodiment, the driven device 220 may be any device that generates vibrations when operating, such as a cooling fan, a vibrator, or a speaker. The driver 110 is a driving circuit configured to drive the driven device 220.

The inertial measurement device 230 includes an inertial measurement apparatus driving circuit 231 and an inertial measurement apparatus 232. The inertial measurement apparatus 232 is an inertial measurement unit (IMU) and is configured to measure a position status of the electronic device 200 to generate sensing information SI. The inertial measurement apparatus driving circuit 231 is coupled to the inertial measurement apparatus 232. In the embodiment, the inertial measurement apparatus driving circuit 231 is coupled to the driver 210 and receives the noise prediction signal PNS generated by the driver 210. The inertial measurement apparatus driving circuit 231 generates compensated sensing information CSI through subtracting the noise prediction signal PNS from the sensing information SI. Compared with the sensing information SI, the magnitude of the vibration noise NS contained in the compensated sensing information CSI may be greatly reduced, and there is a relatively high signal to noise ratio.

On the other hand, in the embodiment, the driver 210 may include a look-up table 211. The look-up table 211 is configured to record look-up information. The look-up information includes multiple strengths of the driving signal DRV and multiple respective corresponding values of the noise prediction signal PNS. The look-up table 211 may be implemented using any form of memory device, such as a non-volatile memory, a dynamic or static random access memory, a hard disk drive, an optical disk drive, or any other form of data storage medium known to persons skilled in the art, and there is no particular limitation.

To explain in detail, taking the driven device 220 as the cooling fan as an example, the look-up information may include multiple strengths of the driving signal DRV respectively corresponding to different rotating speeds of the cooling fans. For example, the cooling fan rotating speed corresponding to a strength A1 is 1000 revolutions per minute (rpm), the cooling fan rotating speed corresponding to a strength A2 is 2000 rpm, . . . , the cooling fan rotating speed corresponding to a strength AN is N*1000 rpm. The look-up information also includes multiple values B1 to BN of the noise prediction signal PNS respectively corresponding to the strengths A1 to AN. In the actual operation, when the strength of the driving signal DRV generated by the driver 210 is one of the strengths A1 to AN, the driver 210 may provide the noise prediction signal PNS as one of the corresponding values B1 to BN to the inertial measurement apparatus driving circuit 231. When the strength of the driving signal DRV generated by the driver 210 is between two strengths (for example, between the strength A1 and the strength A2), the driver 210 may calculate the appropriate value of the noise prediction signal PNS through interpolation according to the strength between the strengths A1 and A2 and the respective corresponding values B1 and B2.

In order to cope with the aging of the driven device 220 as the working time increases, the driver 210 may provide a transmission interface, so that the engineering personnel may update the look-up information at any time to improve the accuracy of the noise prediction signal PNS.

Incidentally, in order to further improve the noise cancellation performance of the sensing information of the position status of the electronic device, the driver 210 further generates the driving signal DRV through a damping control mechanism during the operation of generating the driving signal DRV. Under the understanding of persons skilled in the art, the driving signal DRV generated through the damping control mechanism may reduce the amplitude of the vibrations generated by the driven device 220 and reduce the vibration noise NS that may be generated by the driven device 220 in advance. Regarding the details of the operation of the damping control mechanism in the embodiment, any damping control mechanism known to persons skilled in the art may be applied for execution, and there is no particular limitation.

It can be known from the above description that in the embodiment of the disclosure, the driver 210 may first generate the driving signal DRV through the damping control mechanism, reduce the vibration noise NS that may be generated by the driven device 220 through the driving signal DRV generated under the damping control mechanism, and perform a first order noise compensation operation. Next, the driver 210 provides the corresponding noise prediction signal PNS to the inertial measurement device 230 according to the provided driving signal DRV based on the look-up information recorded in the look-up table 211. The inertial measurement device 230 may cancel the vibration noise NS in the sensing information SI according to the noise prediction signal PNS, and perform a second order noise compensation operation. In this way, the signal to noise ratio of the compensated sensing information CSI may be greatly improved. The position status of the electronic device 200 may also be accurately detected to effectively improve the working performance of the electronic device 200.

Figure 3:
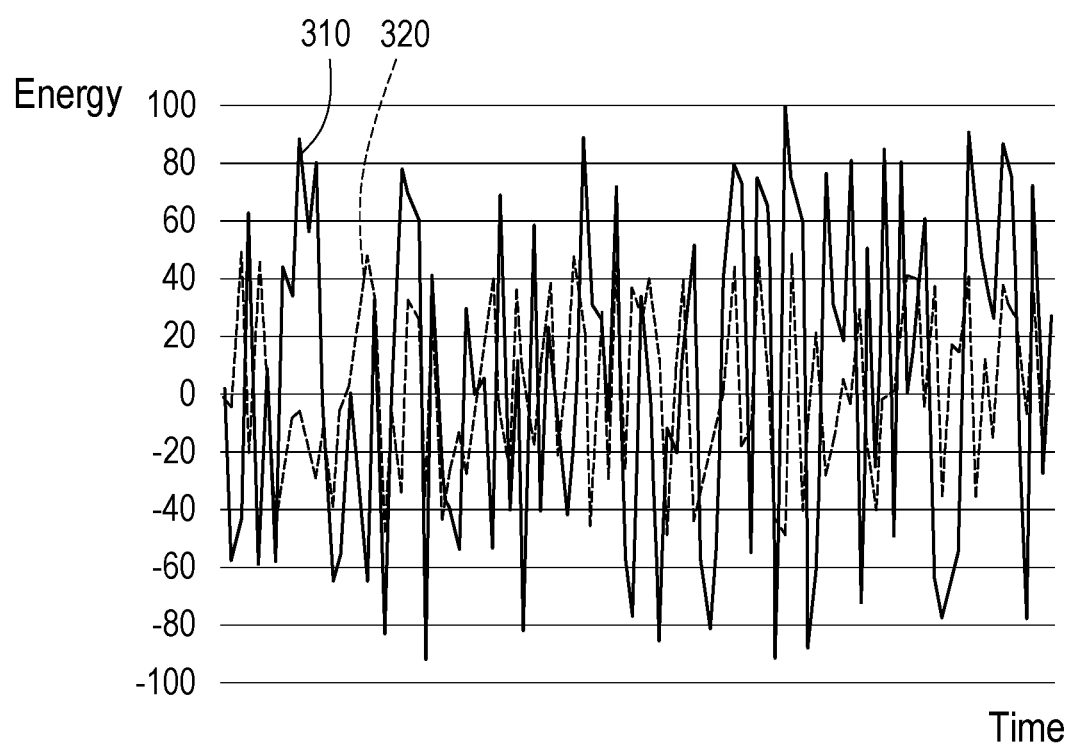
FIG. 3 is an energy comparison diagram of vibration noises before and after a first order noise compensation operation of an electronic device according to an embodiment of the disclosure.

Please refer to FIG. 3. FIG. 3 is an energy comparison diagram of vibration noises before and after a first order noise compensation operation of an electronic device according to an embodiment of the disclosure. A waveform 310 represents a time-varying curve of the energy of the vibration noise before the first order noise compensation operation. A waveform 320 represents a time-varying curve of the energy of the vibration noise after the first order noise compensation operation. According to the waveforms 310 and 320, it can be clearly seen that through the damping control mechanism executed in the first order noise compensation operation, the vibration noise generated by the driven device can be effectively suppressed. Correspondingly, the bandwidth of the vibration noise can also be effectively reduced.

Figure 4:
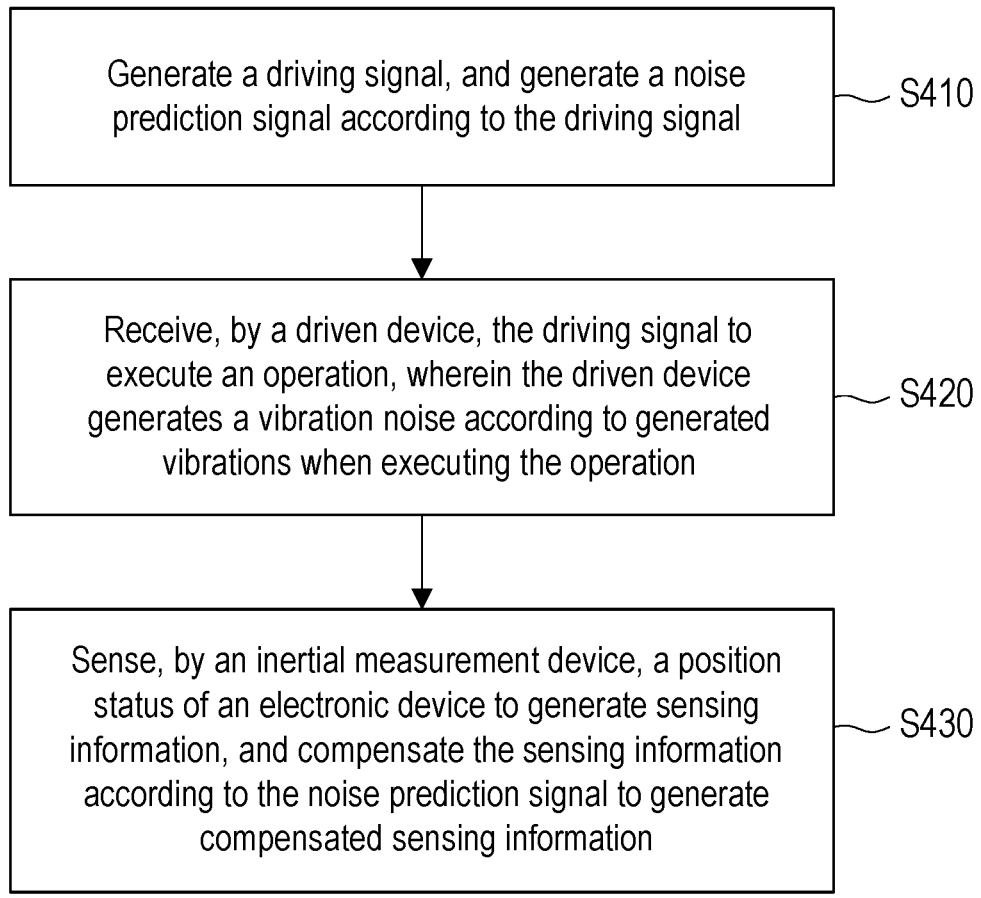
FIG. 4 is a flowchart of a noise cancellation method according to an embodiment of the disclosure.

Please refer to FIG. 4 below. FIG. 4 is a flowchart of a noise cancellation method according to an embodiment of the disclosure. In Step S410, a driver may generate a driving signal, and the driver may generate a noise prediction signal according to the driving signal. In Step S420, a driven device may receive the driving signal to execute an operation, wherein the driven device may generate a vibration noise according to generated vibrations when executing the operation. In the embodiment, the driven device may, for example, be a cooling fan, a vibrator, or a speaker. In Step S430, an inertial measurement device may sense a position status of an electronic device to generate sensing information, and compensate the sensing information according to the noise prediction signal to generate compensated sensing information.

The implementation details of the above steps have been described in detail in the foregoing embodiments and are not repeated here.

In summary, the electronic device of the disclosure generates the noise prediction signal corresponding to the strength of the driving signal when the driver generates the driving signal. In this way, the inertial measurement device may compensate the obtained sensing signal of the position status of the electronic device according to the noise prediction signal, which can effectively improve the signal to noise ratio of the compensated sensing information, and accurately know the position status of the electronic device.

What is claimed is:

1. An electronic device, comprising:
   a driver, configured to generate a driving signal, and generate a noise prediction signal according to the driving signal;
   a driven device, coupled to the driver and receiving the driving signal to execute an operation, wherein the driven device generates a vibration noise according to generated vibrations when executing the operation; and
   an inertial measurement device, coupled to the driver, wherein the inertial measurement device is configured to sense a position status of the electronic device to generate sensing information, and the inertial measurement device receives the noise prediction signal, and compensates the sensing information according to the noise prediction signal to generate compensated sensing information.

2. The electronic device according to claim 1, wherein the sensing information comprises the vibration noise generated by the driven device and the sensing information generated by the position status of the electronic device.

3. The electronic device according to claim 2, wherein the inertial measurement device cancels the vibration noise in the sensing information according to the noise prediction signal to obtain the compensated sensing information.

4. The electronic device according to claim 1, wherein the driver comprises look-up information, and the driver generates the noise prediction signal according to the driving signal based on the look-up information.

5. The electronic device according to claim 4, wherein the look-up information comprises a plurality of strengths of the driving signal and a plurality of respective corresponding values of the noise prediction signal.

6. The electronic device according to claim 1, wherein the driver generates the driving signal through a damping control mechanism.

7. The electronic device according to claim 1, wherein the inertial measurement device comprises:
   an inertial measurement apparatus, configured to sense the position status of the electronic device to generate the sensing information; and
   an inertial measurement apparatus driving circuit, coupled to the driver and the inertial measurement apparatus, receiving the noise prediction signal and the sensing information, and compensating the sensing information according to the noise prediction signal to generate the compensated sensing information.

8. A noise cancellation method, applicable to an electronic device, comprising:
   generating a driving signal, and generating a noise prediction signal according to the driving signal;
   receiving, by a driven device, the driving signal to execute an operation, wherein the driven device generates a vibration noise according to generated vibrations when executing the operation;
   sensing, by an inertial measurement device, a position status of the electronic device to generate sensing information, and compensating the sensing information according to the noise prediction signal to generate compensated sensing information.

9. The noise cancellation method according to claim 8, wherein the sensing information comprises the vibration noise generated by the driven device and position information of the electronic device.

10. The noise cancellation method according to claim 8, wherein the step of generating the compensated sensing information comprises:
    cancelling, by the inertial measurement device, the vibration noise in the sensing information according to the noise prediction signal to obtain the compensated sensing information.

11. The noise cancellation method according to claim 8, wherein the step of generating the noise prediction signal according to the driving signal comprises:
    generating the noise prediction signal according to the driving signal based on look-up information, wherein the look-up information comprises a plurality of strengths of the driving signal and a plurality of respective corresponding values of the noise prediction signal.

12. The noise cancellation method according to claim 8, further comprising:
    generating the driving signal through a damping control mechanism.

* * * * *